Jan. 21, 1947.  F. W. MEREDITH  2,414,654
FLUX VALVE
Filed Dec. 8, 1943
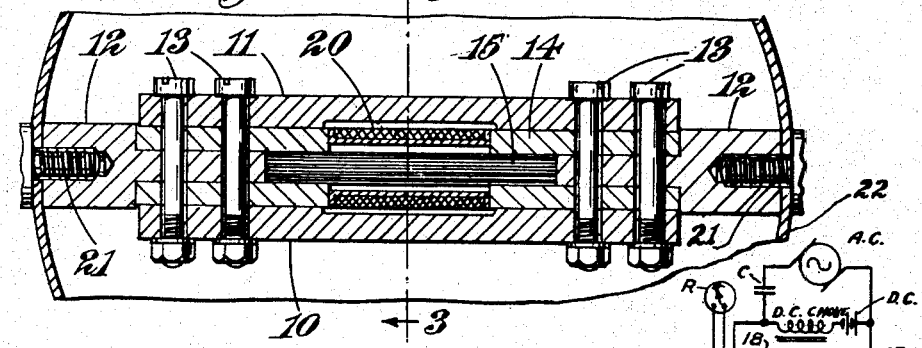
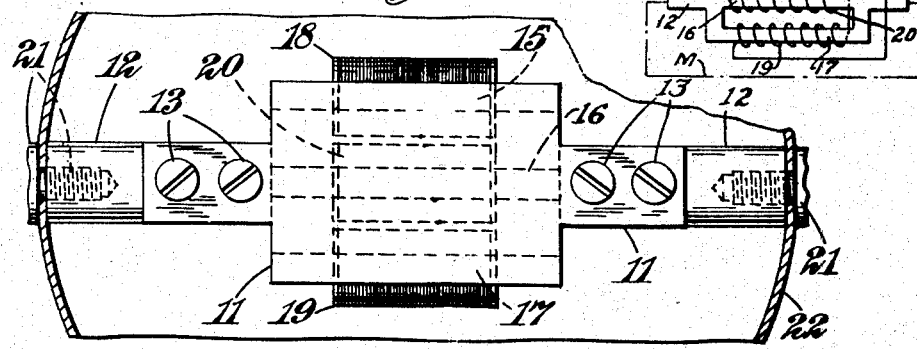
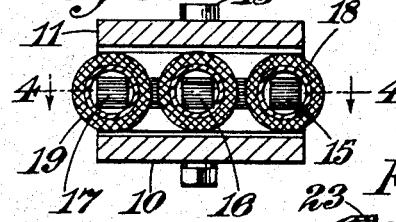
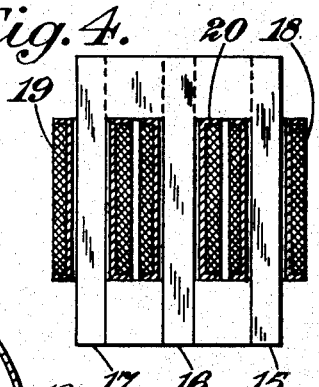
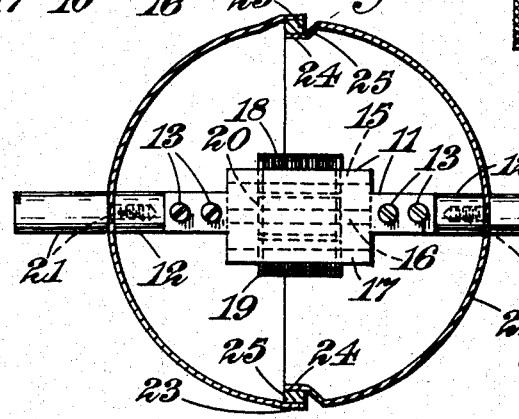
INVENTOR
Frederick Wm. Meredith
BY
Watson, Cole, Grindle & Watson Patented Jan. 21, 1947

2,414,654

UNITED STATES PATENT OFFICE 2,414,654

FLUX VALVE

Frederick William Meredith, London, England, assignor to S. Smith & Sons (England) Limited, a British company Application December 8, 1943, Serial No. 513,432
In Great Britain August 13, 1942

3 Claims. (Cl. 177—380)

This application corresponds to the application of S. Smith & Sons (Motor Accessories) Limited and Frederick William Meredith, Serial No. 11,367/42, which was filed in Great Britain on August 13, 1942.

This invention consists of improvements in or relating to devices for detecting or measuring magnetic fields and particularly to magnetic compasses. Examples of such devices have been described in British Patent No. 451,850 according to which the existence or direction of a magnetic field is indicated by its inductive effect on one or more pick-off coils wound on a magnetic core which has its reluctance varied by a periodically-variable current supplied to auxiliary coils on a core part, the current in the auxiliary coils not inducing any voltage in the pick-off coils, and the present invention relates to devices of that type. Magnetic compasses for indicating the direction of the earth's field by such methods are generically referred to as flux-gate compasses, because the magnetic flux due to the earth's field may pass to a greater or less extent through the core or cores of the auxiliary coils which thus act as flux gates which provide the periodic variation in reluctance of the core through which the earth's magnetic flux passes.

According to this invention a device for detecting or measuring a magnetic field (such as a magnetic compass) comprises one or more pick-off coils wound on a first magnetic core which receives the magnetic flux from the magnetic field (e. g. the earth's field) the existence, strength or direction of which is to be detected or measured, and two or more cores which are in parallel with the first core and which are wound with auxiliary coils arranged to receive an alternating or pulsating current and which afford a closed path for the periodically-varying flux produced by said pulsating current so that (a) this periodically-varying flux periodically varies the permeability of the cores of said auxiliary coils, (b) the flux from the magnetic field whose existence, strength or direction is to be detected or measured passes to a greater or less extent through the cores of the auxiliary coils, (c) the flux through the first magnetic core is thereby periodically varied to induce an alternating E. M. F. across the pick-off coil or coils wound thereon, and (d) such induced E. M. F. in the coil or coils wound on said first core is proportional to the rate of change of the flux through said first core and thereby affords a detection or measure of the aforesaid magnetic field.

A pulsating current in the auxiliary coils may be produced by applying to the coils both an alternating current and a direct current. The main object of this combination is to prevent frequency doubling, and this will be understood when it is realized that with an applied alternating current there would be two peaks or points of saturation during each complete cycle. At peak value, the magnet is virtually non-permeable and is open to the D. C. flux twice per cycle, therefore giving rise to double frequency. By applying the proper combination of D. C. and A. C. current, a pulsating, rather than an alternating, effect is obtained, and the device is thus polarized, yielding but one peak or saturation per cycle and of the same polarity. Also, the use of a direct current of lower amperage than the alternating current enables any residual magnetism due to remanence in the cores to be wiped out.

In order to collect as much of the earth's field as possible hemispherical collector plates of magnetic material may be secured to the two ends of the parallel cores, the collector plates being separated by a circular packing of non-magnetic material so as to form a substantially spherical case.

In the accompanying drawing which illustrates diagrammatically and by way of example one form of magnetic compass embodying this invention and suitable for use on a moving craft such as a ship or aeroplane for purposes of directional indication or control:

Figure 1 is a part sectional elevation,

Figure 2 is a part plan with the casing in section,

Figure 3 is an end view of the central assembly only,

Figure 4 is a plan of the assembly of laminations only with their windings,

Figure 5 is a plan like Figure 2 but showing the completed apparatus (with casing in section), and Figure 6 is a wiring diagram indicating one way of energizing the device.

An iron bar 12 at each end of the device is secured (say by bolts 13) to a central bar 14 or core frame portion comprising three iron cores 15, 16, 17 which are preferably laminated and are parallel with one another and with the axis of the end bars 12. In bolting the bars 12 to the core frame 14 it is preferred that cover plates 10 and 11 shall also be secured by the bolts. The end bars 12 and the central core 16 constitute the path for the earth's field and the two outer cores 15, 17 are also convenient paths for the magnetic flux of the earth's field from the end bars 12 but the outer cores 15, 17 are wound with auxiliary coils 18, 19 which receive a pulsating current produced by applying to these coils 18, 19 both a direct current and an alternating current. This may be done by means of the circuit illustrated in Figure 6 of the drawing in which the source of alternating current is indicated as well as the source of direct current and the D. C. choke. A condenser C is also placed in series with the source of alternating current across the lines of which the D. C. source and the choke are shunted. The D. C. is less than the peak A. C. so that remanent magnetism in the cores 15, 17 can be wiped out.

The central core 16 is also wound with a conducting coil 20 which is a pick-off coil and is in circuit with indicating or controlling devices suggested diagrammatically at R. For convenience of assembly and as described above the coils or windings are enclosed in cover plates 10 and 11.

The outer ends of the end bars 12 are tapped and on each end is secured by a screwed stud 21 a hemispherical collector plate 22 of magnetic material. The rims of these collector plates may be bent as at 23, 24 so that the two rims overlap without touching and the rims are separated from one another by a circular packing piece 25 of non-magnetic material, say of brass.

The broken line M in Figure 6 indicates the external magnetic field or path to be detected or measured.

The operation of this device is as follows: As the bars 12, 14 and cores 15, 16, 17 rotate in azimuth with their axis horizontal, the flux due to the horizontal component of the earth's magnetic field which passes through the bars 12, 14 is proportional to the cosine of the angle which the bars make with the magnetic meridian. The flux flowing through the bars is therefore a measure of the inclination of the bars to the meridian.

The application of the pulsating current to the outer cores 15, 17 saturates these cores to a definite degree in a periodic manner and the result is that while the magnetic flux of the earth's field passes through the central core 16 that flux is periodically varied owing to the periodic saturation of the outer cores. This periodic variation in the flux through the central core 16 induces an alternating current in the conducting coil 20 wound thereon and such induced current is proportional to the flux through the central core 16 and can therefore be used for detecting and measuring the existence or direction of the earth's magnetic field.

The device as thus described may be considered as comprising four interassociated flux paths, one being an external path carrying the horizontal component of the earth's magnetic field and including the antennae bars 12, 14; another being the central leg or core section 16 carrying the detector or search coil, and the remaining two being the outer legs 12 and 17 adapted to be saturated by the application of the pulsating current.

According to British patent specification No. 451,850 the core, of which the reluctance is periodically varied by the varying current in the auxiliary coils, is magnetically in series with the core through the pick-off coil or coils. It has been found that the sensitivity of such an arrangement is low unless long magnetic antennae or large collector screens are employed on account of the demagnetising field of the free poles induced in the antennae. For a short open magnetic system the total flux induced in the open core by a field which it may be desirable to explore, is determined primarily by the balancing of the field by the fields of the free poles (the strength of which is proportional to the total flux) and only to a slight extent by the reluctance of the core unless the reluctance of the core is very large. Since large reluctances cannot be obtained with practical core dimensions by the saturation effect of practical currents in the auxiliary coils, the varation of flux through the core of the pick-off coils is necessarily small. This limitation can only be overcome by the use of large collectors which will reduce the field of the free poles.

The reluctance of the cores through the auxiliary coils may, however, easily be varied in the ratio of say 50:1. Thus when the core of the pick-off coil is placed magnetically in parallel, the relative reluctances of the two paths may be varied from the ratio of 1:7 to the ratio of 7:1.

Thus the proportion of the flux passing through the pick-off coil may be made to vary from $\frac{1}{8}$ to $\frac{7}{8}$ of the total flux and a sensitive system may be provided with relatively short antennae.

Furthermore, the demagnetising effect of the free poles may be greatly reduced if they are dispersed over the surface of a sphere instead of being concentrated in the antennae. Thus by the use of hemispherical collectors and by placing the two core systems in parallel instead of in series, a practical low-field detector or meter may be constructed within a maximum dimension of a few inches. Thus in the example illustrated, the hemispherical collectors 22 act as magnetic collectors for the bars 12, 14.

I claim:

1. A magnetic flux sensitive device comprising, in combination, a core of magnetic material divided into three substantially parallel legs interconnected at their ends, a pick-up coil wound on the central leg, and the other two legs with their end connections comprising a closed flux loop, a winding on said closed flux loop, and means for supplying both alternating current and direct current to said winding, said alternating and direct currents being of said characteristics as to saturate said loop but once during each cycle.

2. A magnetic flux sensitive device comprising, in combination, a core of magnetic material divided into three substantially parallel legs interconnected at their ends, a pick-up coil wound on the central leg, and the other two legs with their end connections comprising a closed flux loop, a winding on said closed flux loop, and means for supplying both alternating current and direct current to said winding, said alternating and direct currents being of said characteristics as to saturate said loop but once during each cycle, said direct current being less than the back alternating current whereby remanent magnetism in said flux loop is wiped out.

3. A magnetic flux sensitive device comprising, in combination, a core of magnetic material divided into three substantially parallel legs interconnected at their ends, a pick-up coil wound on the central leg, and two other coils wound on the two outer legs and connected in assisting M. M. F. relation, said core also including two antennae extending in opposite directions from the interconnected ends of said legs, said antennae including hemispherical collector plates of magnetic material, the circular edges of said collector plates being directed inwardly toward each other and separated by non-magnetic material, whereby a substantially spherical casing is provided for the device.

FREDERICK WILLIAM MEREDITH.